United States Patent [19]

Ullman et al.

[11] Patent Number: 5,509,678
[45] Date of Patent: Apr. 23, 1996

[54] RECUMBENT BICYCLE

[76] Inventors: David G. Ullman, 1655 NW. Hillcrest Dr.; Paul A. Atwood, 2315 SE. Crystal Lake Dr., both of Corvallis, Oreg. 97330

[21] Appl. No.: 406,647

[22] Filed: Mar. 20, 1995

Related U.S. Application Data

[63] Continuation of Ser. No. 188,036, Jan. 28, 1994, abandoned.

[51] Int. Cl.$^6$ .................................................. B62K 3/02
[52] U.S. Cl. .................. 280/281.1; 280/287; 280/288.1
[58] Field of Search ..................................... 280/263, 270, 280/271, 272, 273, 274, 287.1, 284, 287, 288.1, 288.3, 220, 278; 297/215.14; 248/424, 298

[56] References Cited

U.S. PATENT DOCUMENTS

| | | | |
|---|---|---|---|
| 582,279 | 5/1897 | Gold | 280/272 |
| 583,130 | 5/1897 | Smith | 280/272 |
| 600,046 | 3/1898 | Sparks | 280/271 |
| 3,588,144 | 6/1971 | Padial | 280/276 X |
| 3,807,762 | 4/1974 | Ogisu | 280/287 |
| 3,811,705 | 5/1974 | D'Ambra | 280/276 X |
| 4,129,317 | 12/1978 | Bell | 280/274 |
| 4,283,070 | 8/1981 | Forrestall et al. | 280/274 |
| 4,527,811 | 7/1985 | DeMoss | 297/215.14 X |
| 4,548,421 | 10/1985 | Wiener | 280/288.1 |
| 4,659,098 | 4/1987 | Jacobson | 280/288.1 |
| 4,786,070 | 11/1988 | Adee | 280/288.1 |
| 4,789,173 | 12/1988 | Lofgren et al. | 280/282 X |
| 4,824,130 | 4/1989 | Chiu | 280/287 |
| 4,925,203 | 5/1990 | Buckler | 280/288.1 |
| 5,201,538 | 4/1993 | Mayn | 280/282 X |
| 5,364,160 | 11/1994 | Fritschen et al. | 280/283 X |

FOREIGN PATENT DOCUMENTS

| | | | |
|---|---|---|---|
| 3540976 | 5/1987 | Germany | 280/282 |

OTHER PUBLICATIONS

*Popular Science*, Jan. 1994, "What's New", p. 18.

*Primary Examiner*—Margaret A. Focarino
*Assistant Examiner*—Victor E. Johnson
*Attorney, Agent, or Firm*—J. Preston Oxenham

[57] ABSTRACT

A recumbent bicycle has a tubular frame member with a longitudinal axis running from front to rear. A rear support module includes a saddle for nestingly embracing a rear portion of the frame member. Cantilever support members extend downward from the saddle to free ends which are attached to an axle for a rear wheel. A head tube and bearing attached to the front of the frame member support a head shaft and a fork with a bifurcated lower portion suitable for mounting a front wheel. The fork lies generally in a plane and is supported, set forward of the head shaft, by extension plates such that the head shaft axis intercepts the fork plane. A drive sprocket assembly is at the front of the frame member. A seat assembly has opposing track slides engaging a track at the top of the frame member. The slides can be drawn together to clamp the track and fix the seat. The fork and rear support member are of such relative lengths that the front of the frame member is closer to a supporting surface than the rear of the member and, when the seat is moved along the track toward the sprocket assembly, it also moves toward the steering stem and the supporting surface.

15 Claims, 8 Drawing Sheets

RECUMBENT BICYCLE

This application is a continuation of application Ser. No. 08/188,036, filed Jan. 28, 1994 and now abandoned.

FIELD OF THE INVENTION

The present invention relates, generally, to bicycles and, particularly, to recumbent bicycles.

BACKGROUND OF THE INVENTION

Advantages of recumbent bicycles have been known to those of the bicycle art for many years. It is generally acknowledged that bicycles of recumbent configuration have a potential for greater riding comfort and speed than "conventionally" configured bicycles. Nonetheless, recumbent bicycles of the prior art are generally awkward to ride, and significant practice is required of experienced riders of conventional bicycles to transition to them. Many of these bicycles, of both the short and long wheel base classification, have their handle bars for steering mounted on a pivot point beneath the rider. Others, generally of long wheel base configuration, have handle bars extending rearward from steering shafts mounted in a steering head positioned well forward of the rider with the result that the riders hands sweep through a large radius arch, in the manner of a tiller control, when steering rather than rotating about a near central pivot point as is typical of a conventional bicycle.

Many recumbent bicycles of the prior art have been provided with seats supported by telescoping structures which are adaptable to be ridden by riders of only a very limited range of leg lengths. Often the seats move only horizontally and are very close to the ground, which makes support of the bicycle when at rest awkward for longer-legged riders. Other recumbent bicycles of the prior art, while incorporating seats with inclined movement, have utilized under the seat steering making the bicycle difficult to mount for riders of all leg lengths.

Quality, light-weight recumbent bicycles of the prior art have generally been expensive to produce. To provide sufficient rigidity, they have employed space frames composed of numerous frame elements which require many accurate welds and are thus labor intensive to produce. If a manufacturer of such a recumbent offers models incorporating varied features, such as a different wheel base or a tricycle configuration, a different frame incorporating substantially or entirely different frame elements from those of the base model must be produced. This requires preparation of new production drawings, production of the new elements and new jigs for their assembly.

DISCLOSURE OF THE INVENTION

It is an object of the present invention to provide a recumbent bicycle which is easy to ride and may be ridden by riders experienced with conventional bicycles without extensive training or practice.

It is an object of the present invention to provide a recumbent bicycle which is adaptable to allow riders within a large range of size and proportion to ride comfortably and effectively.

It is also an object of the present invention to provide a quality, light-weight, recumbent bicycle which is economical to manufacture.

It is a further object of the present invention to provide a recumbent bicycle of a modular design which will allow a number of models with varied features to be produced economically.

A recumbent bicycle comprising a preferred embodiment of the present invention includes a tubular longitudinal frame member extending from a steering head tube, which is supported by a front fork, to a rear portion, which is supported by a rear support module. The rear support module includes a saddle which nestingly receives a rear portion of the frame member. Two support members extend downward from each of two sides of the saddle to free distal ends to which an axle carrying a rear wheel is attached. A steering head shaft is retained in rotatable, coaxial relation within the steering head tube by a steering head bearing. A front fork carrying a front axle and wheel is supported before the head tube and shaft by upper and lower support plates attached to the steering head shaft above and below the steering heat tube, respectively. A steering stem extends upward from the steering shaft along a common axis and handle bars are mounted to the top of the steering stem in a "T" configuration. A pedal and sprocket assembly is fixed to a forward portion of the frame member and a seat track extends along the top of the frame member. The track is engaged by slides of a seat assembly. The assembly has track slides with first and second portions and a clamping mechanism to draw the slide portions one toward the other to clamp the track between them and fix the position of the seat assembly along the track. When supported by the front and rear wheel, the frame member slopes downward to the steering tube so that, when the seat is moved forward toward the pedal and sprocket assembly is also moved downward, closer to the ground. The frame member may extend rearward to form a fender over the rear wheel.

Other objects, advantages and aspects of the invention will become apparent upon reading the following detailed description and claims and upon reference to the accompanying drawings.

DETAILED DESCRIPTION OF THE INVENTION

A recumbent bicycle 10 comprising an exemplary preferred embodiment of the present invention is shown in FIG.

Figure 3:
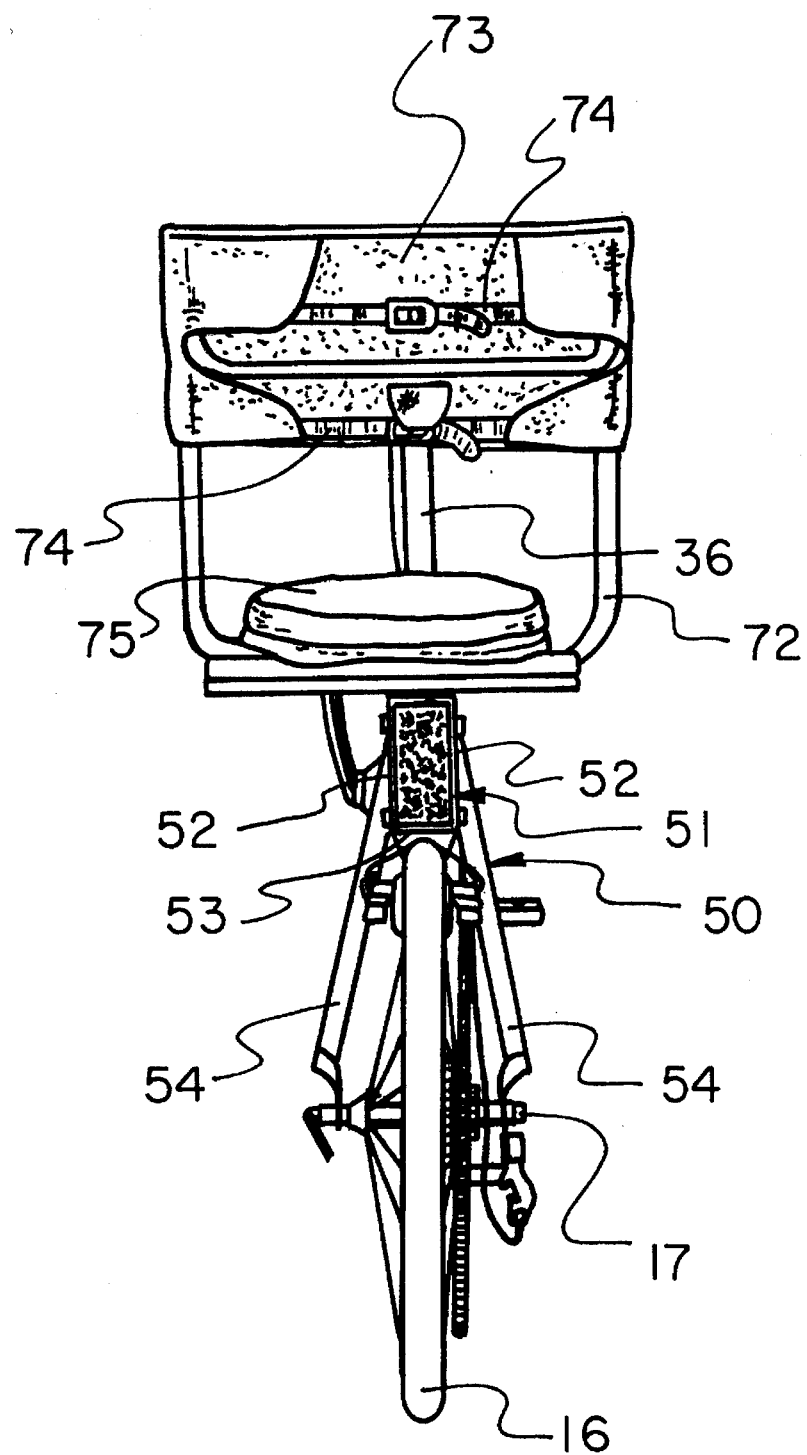
FIG. 3 is a rear view of a recumbent bicycle comprising a preferred embodiment of the present invention projected on a plane normal to the longitudinal axis of the tubular frame member.
Figure 4:
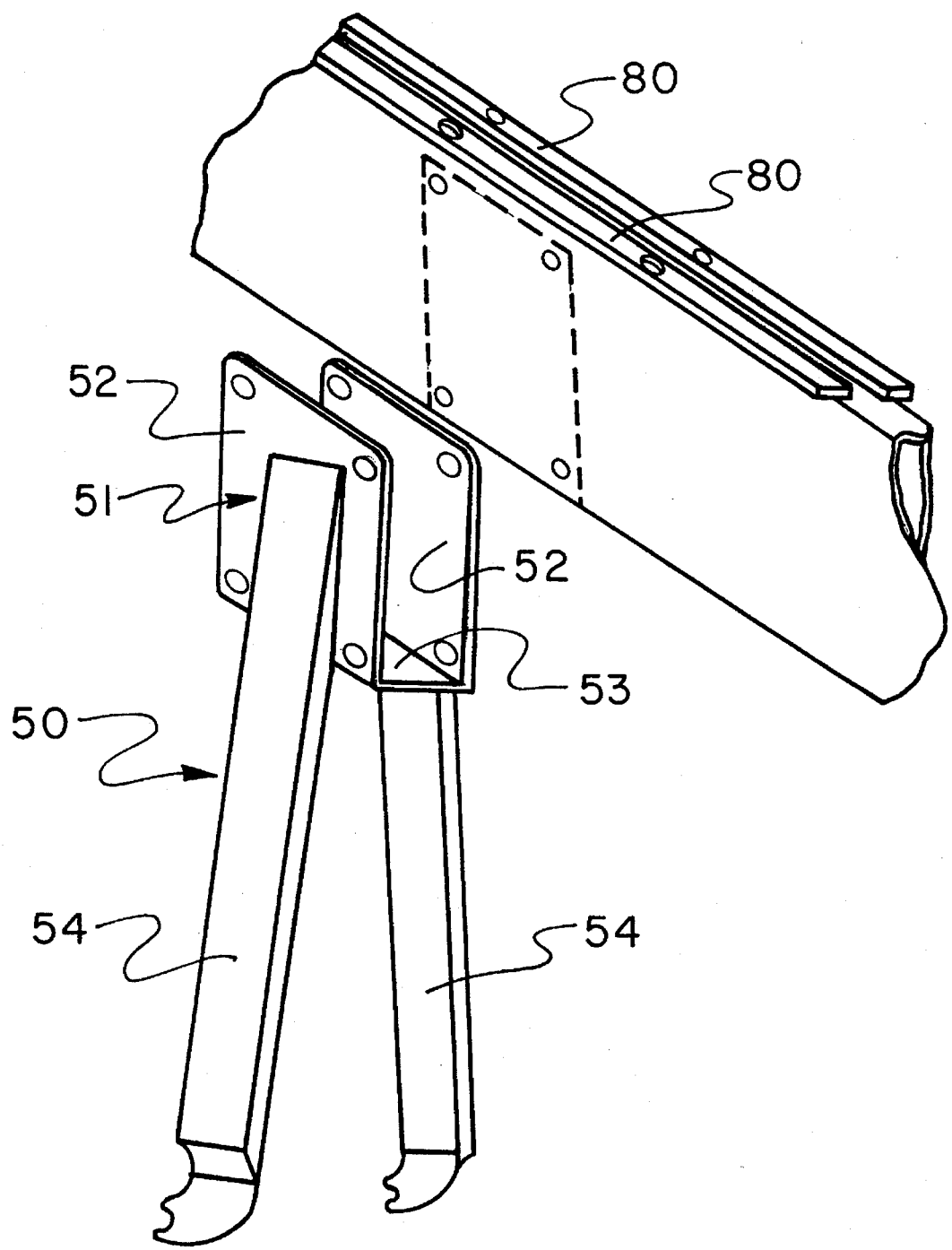
FIG. 4 is a partial isometric exploded view showing the relation of the frame member and support saddle of the embodiment of FIG. 1.
Figure 5:
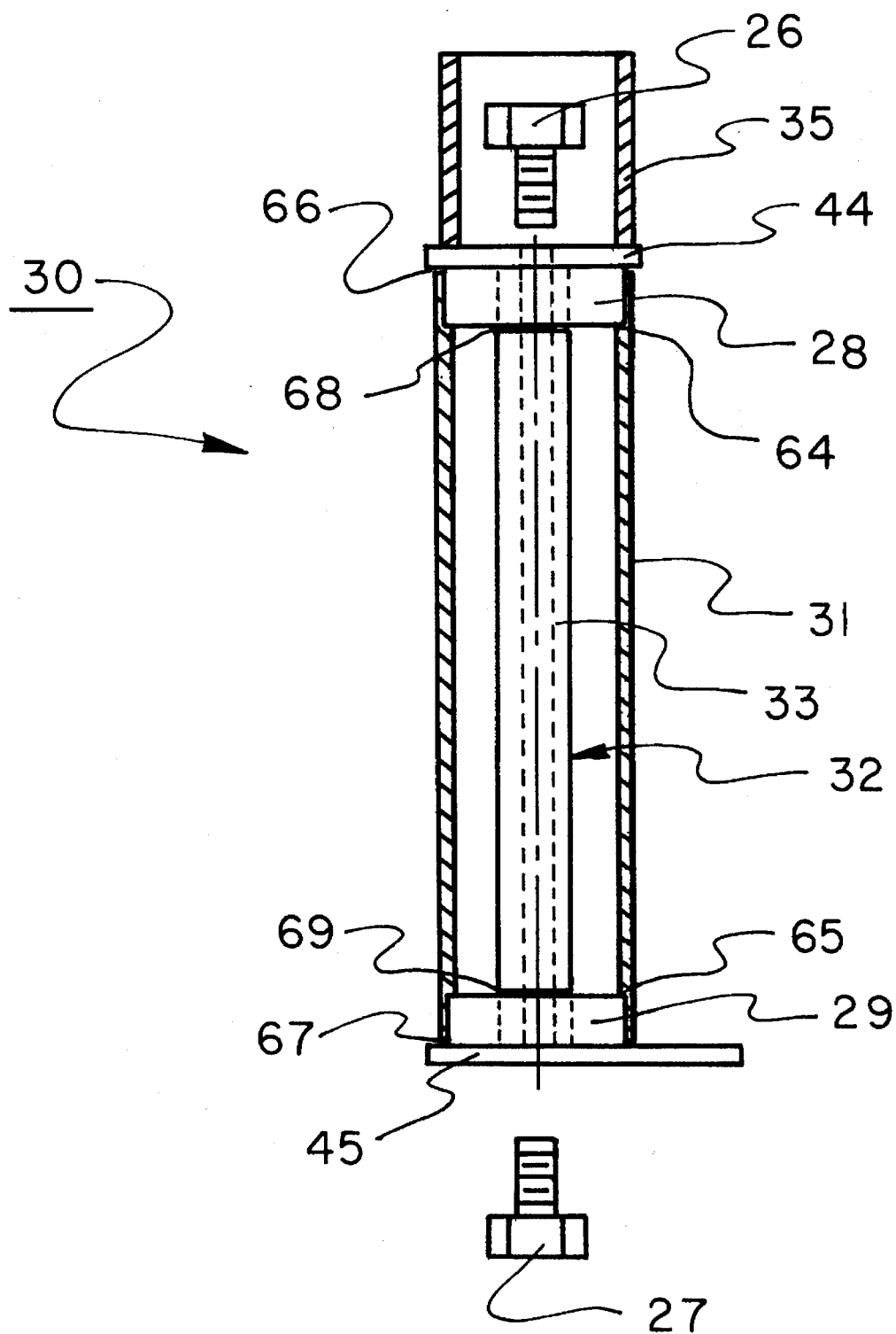
FIG. 5 is a partially exploded sectional view of the steering head assembly of the embodiment of FIG. 1.

1 in side elevation and includes frame member 12 which extends rearward from steering head tube 30. A rear portion of frame member 12 is supported by support saddle 51 of rear support module 50. As may best be seen in FIG. 3, which is a rear view of recumbent bicycle 10 projected on a plane normal to the longitudinal axis of member 12, saddle 51 of the preferred embodiment is formed with side panels 52 and bottom panel 53 sized to nestingly embrace frame member 12. Rear support module 50 also includes cantilever support members 54 which extend downward from side panels 52 of saddle 51 to free distal ends 55, to which rear axle 17 carrying rear wheel 16 is attached. As may best be seen in FIGS. 4 and 5, frame member 12 of exemplary bicycle 10 is tubular and may be fabricated of any suitably rigid and light material, for example, aluminum. Rear support module 50 may be fabricated of any suitably strong material, for example steel, and member 12 may be fixed within saddle 51 by any fasteners well known in the art, for example nut and bolt sets 56. The side walls and top of frame member 12 extend behind support module 50 to provide a fender over rear wheel 16.

Steering head 30 includes steering head tube 31 attached to the front of frame member 12. As may best be seen in the sectional view of FIG. 5, steering head shaft 32 of the exemplary preferred embodiment includes bearing spacer 33 and upper and lower steering shaft bolts 26, 27 and retained within steering head tube 31 by upper and lower steering head bearings 28, 29 which allow steering head shaft 32 to be rotated about the common steering head axis of tube 31 and shaft 32, upper and lower steering head bearings 28, 29 of the exemplary embodiment are preferably cartridge bearings and are inserted into the upper and lower ends of steering tube 31 until the outer race casings of upper and lower bearings 28, 29 abut upper and lower support shoulders 64, 65, formed within upper and lower ends of steering tube 31, respectively. Upper and lower steering shaft bolts 26, 27 pass through upper and lower support plates 44, 45 and upper and lower bearings 28, 29 and are threaded into internal threads in upper and lower portions of bearing spacer 33, respectively.

It is generally desirable to provide a small amount of frictional resistance to turning motion of steering head shaft 32 to improve handling characteristics and rideability of recumbent bicycle 10. To provide an adjustable frictional resistance to turning motion of steering head shaft 32, shoulders 64, 65 are located at a distance within the upper and lower ends of steering tube 31 which provides upper and lower gaps 66, 67 between the upper and lower steering tube ends and upper and lower support plates 44, 45, respectively; and, bearing spacer 33 is of a length which provides upper and lower gaps 68, 69 between the upper and lower ends of spacer 33 and the inner race casings of bearings 28, 29, respectively. This arrangement allows frictional resistance to turning motion of steering shaft 32 within steering tube 31 to be adjusted by selectively tightening steering shaft bolts 26 and 27 to adjust the nominal longitudinal compressive force acting upon steering head bearings 28, 29 along the steering head axis.

Front fork assembly 40 includes support members 42 which extend downward to free distal ends to which front axle 19 carrying front wheel 18 is affixed. Support members 42 are attached to upper and lower support plates 44, 45 which are affixed to and extend from steering shaft 32 and lie, generally, in a plane normal to the common axis of tube 31 and shaft 32.

Handlebar stem 36 extends upward along the steering head axis from a base fixed within stem tube 35, which is attached to the top of steering shaft 32, to support handle bars 38. Stem 36 includes two telescoping tube sections fixed in longitudinal relation by clamp 37 to allow adjustment of the height of handlebars 38.

A crankset tube is mounted through a forward portion of frame member 12 and, as will be readily understood by those familiar with the art, crankset 60 is retained in fixed rotatable position relative to frame member 12 by crank bearings mounted within the tube.

Figure 6:
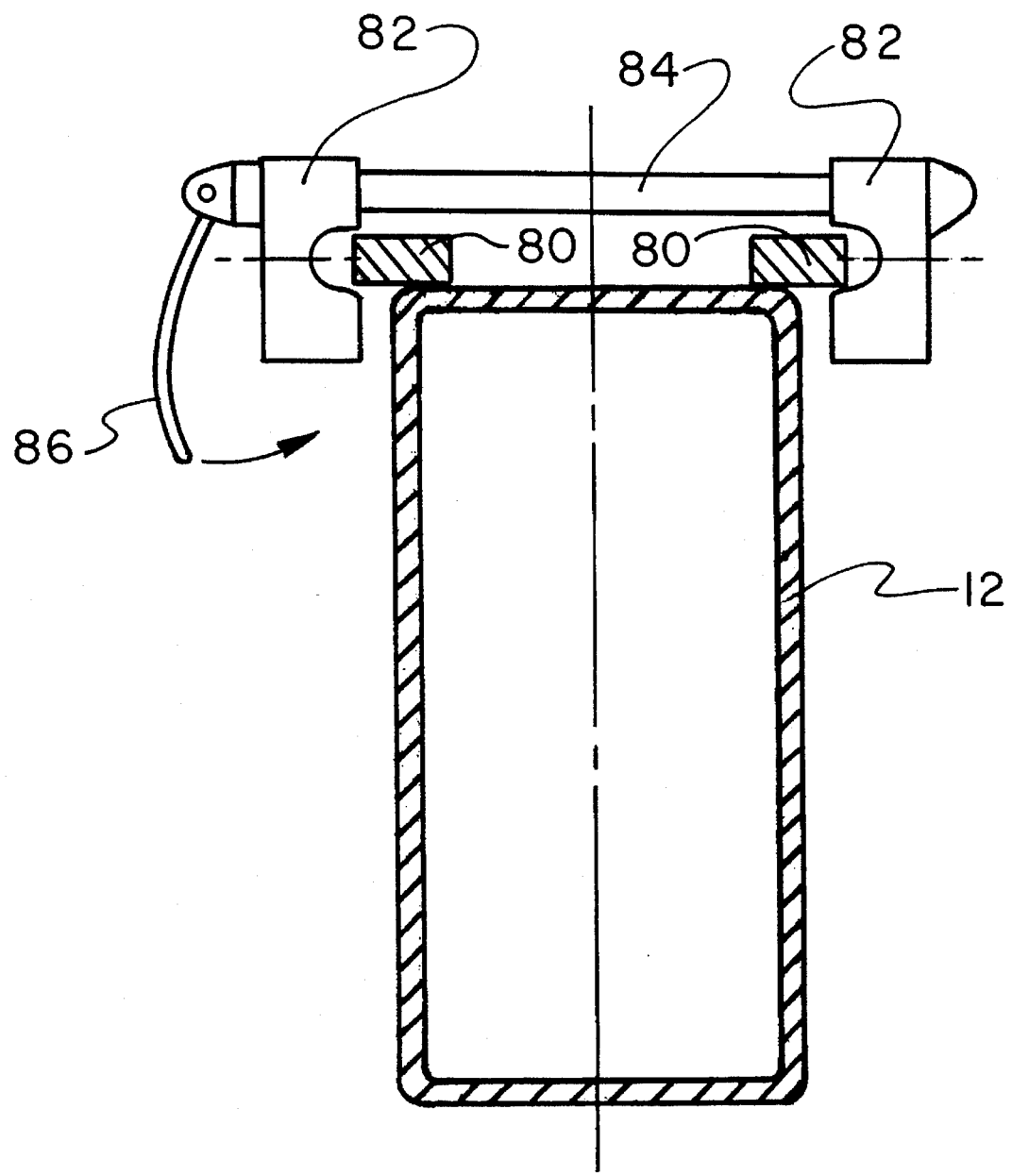
FIG. 6 is a partial section view, taken at IV—IV in FIG. 1 of the frame member and seat track of a recumbent bicycle comprising a preferred embodiment of the present invention.

Seat assembly 70 may be moved longitudinally along seat tracks 80 on top of frame member 12 to adjust the distance between seat back 73 and crankset 60 to accommodate riders of various leg lengths. Seat assembly 70 includes seat frame 72 which supports base cushion 75 and back web 73. Adjustment straps 74 allow adjustment of slack in web 73 to accommodate various desired sitting positions. As may best be seen in FIG. 6, which shows a partial cross sectional view of the bicycle of FIG. 1 taken at VI–VI, seat assembly 70 further includes opposing slide blocks 82 which embrace seat tracks 80. A quick release 84, such as those commonly utilized to mount wheel axles of bicycles, passes through slide blocks 82. Seat assembly 70 may be fixed in a desired position along tracks 80 by moving the quick release lever in the direction of the arrow to draw blocks 82 together, one toward the other, to clamp upon tracks 80. Blocks 82 are preferably made of an elastic material, such as Delrin (a trademark of Dupont Corporation) acetal resin material so that sufficient pressure and concomitant friction is maintained on tracks 80 to maintain assembly 70 in position along the track after quick release lever 86 is cammed over.

Figure 1:
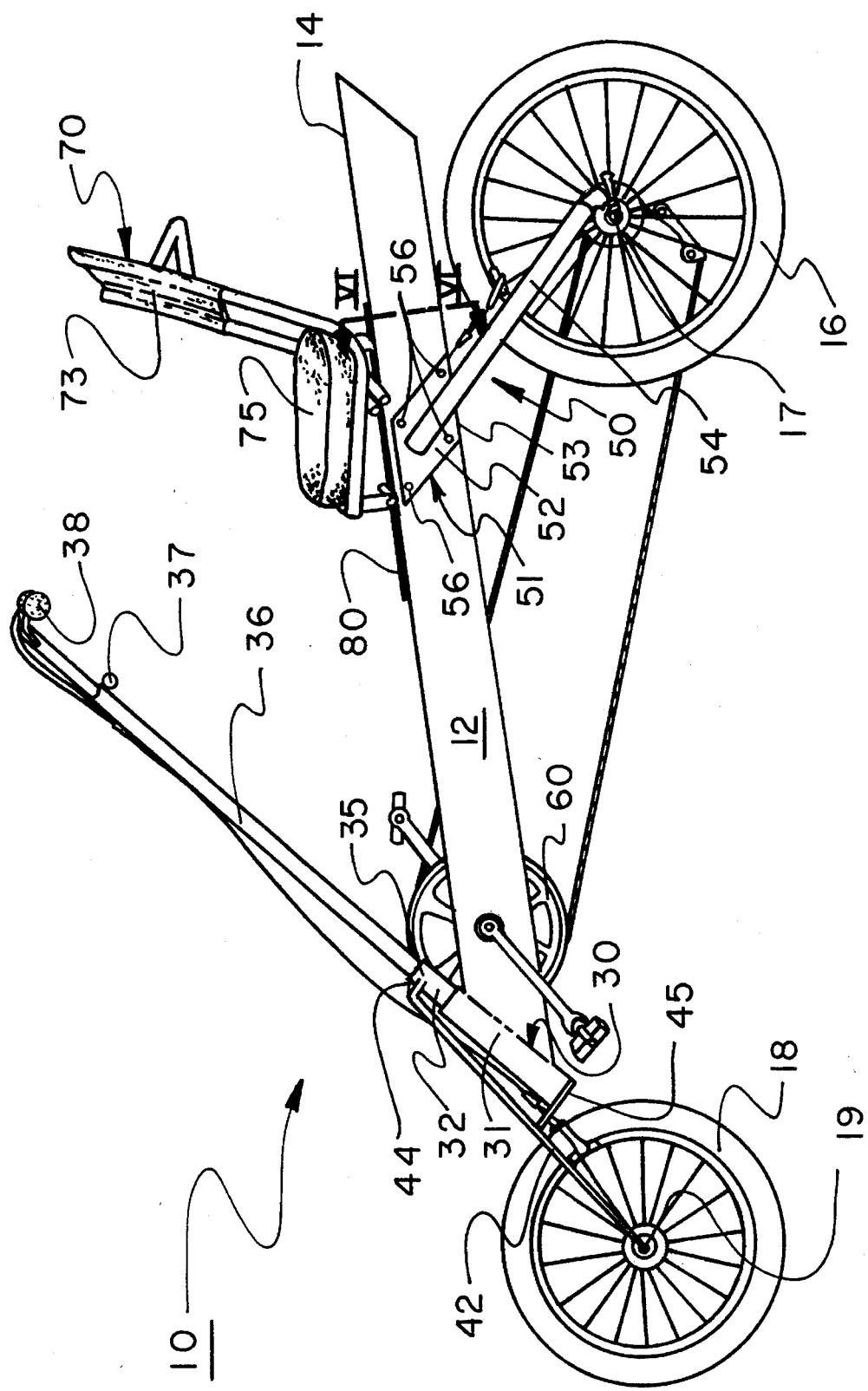
FIG. 1 is a side elevation of a recumbent bicycle comprising a preferred embodiment of the present invention.
Figure 2:
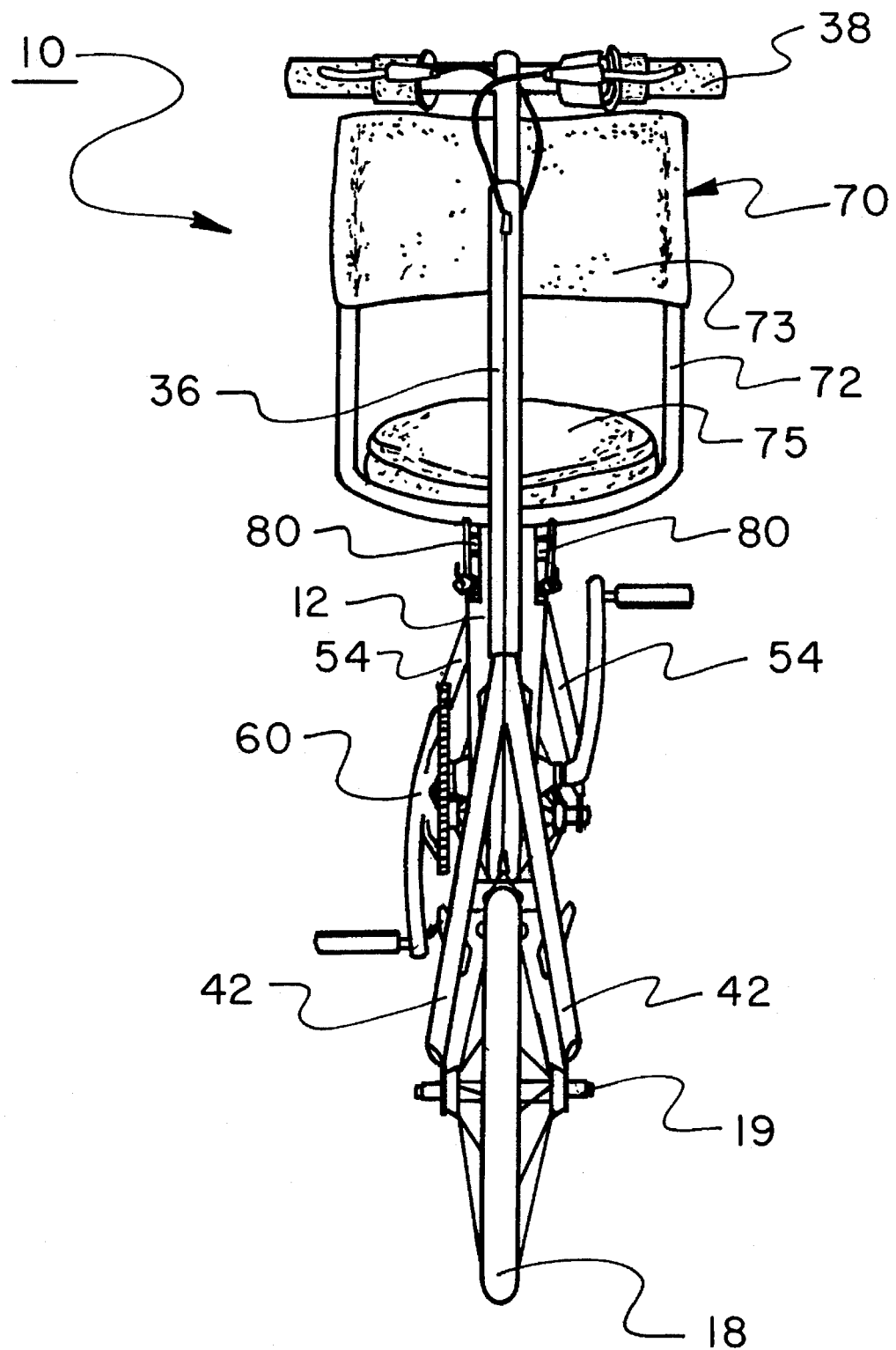
FIG. 2 is a front elevation of a recumbent bicycle comprising a preferred embodiment of the present invention.
Figure 7:
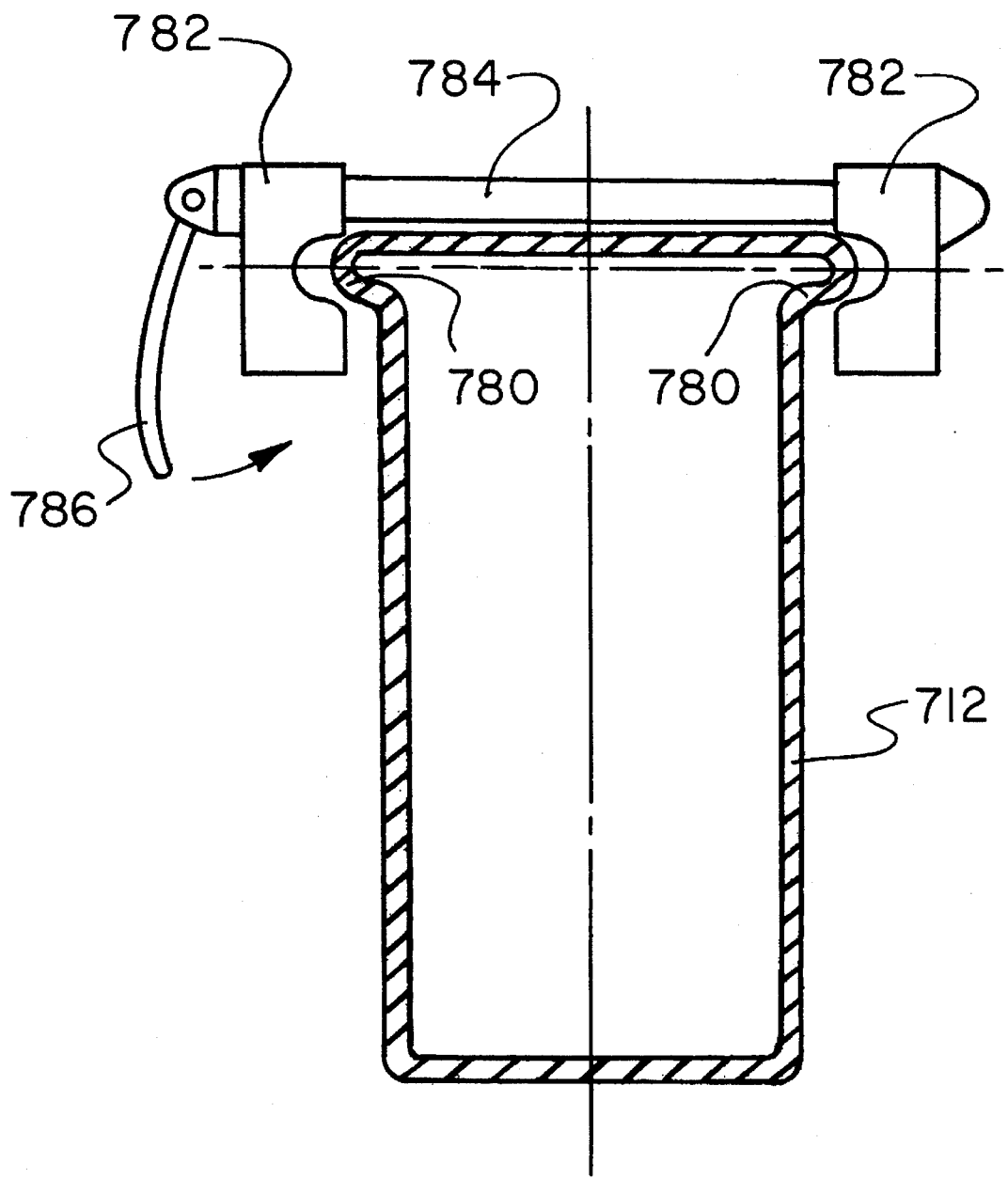
FIG. 7 is a partial section view of the frame member and seat track of a recumbent bicycle comprising an alternative embodiment of the present invention.

A cross section of frame member 712 of a bicycle comprising an alternative embodiment of the invention is shown in FIG. 7 in which similar reference numbers indicate elements similar to the embodiment of the bicycle of FIG. 1. In the alternative embodiment, seat tracks 780 are formed integrally with the tubular section of frame member 712.

Frame member 12 of recumbent bicycle 10 slopes downward from support saddle 51 toward steering tube 31 so that, when seat assembly 70 is relocated forward, closer to crankset 60 for a rider with shorter legs, it is also moved closer to the ground. Front fork assembly 40 allows the angle of the steering head axis to be selected to generally provide a comfortable hand position for all riders. Once this angle is selected, the extension lengths of upper and lower support plates 44, 45 may then be determined to provide the desired trail of the ground contact point of front wheel 18 behind the point at which the steering head axis intercepts the ground. No sharply curved fork members are utilized beneath the steering head as in conventional fork designs.

Figure 8:
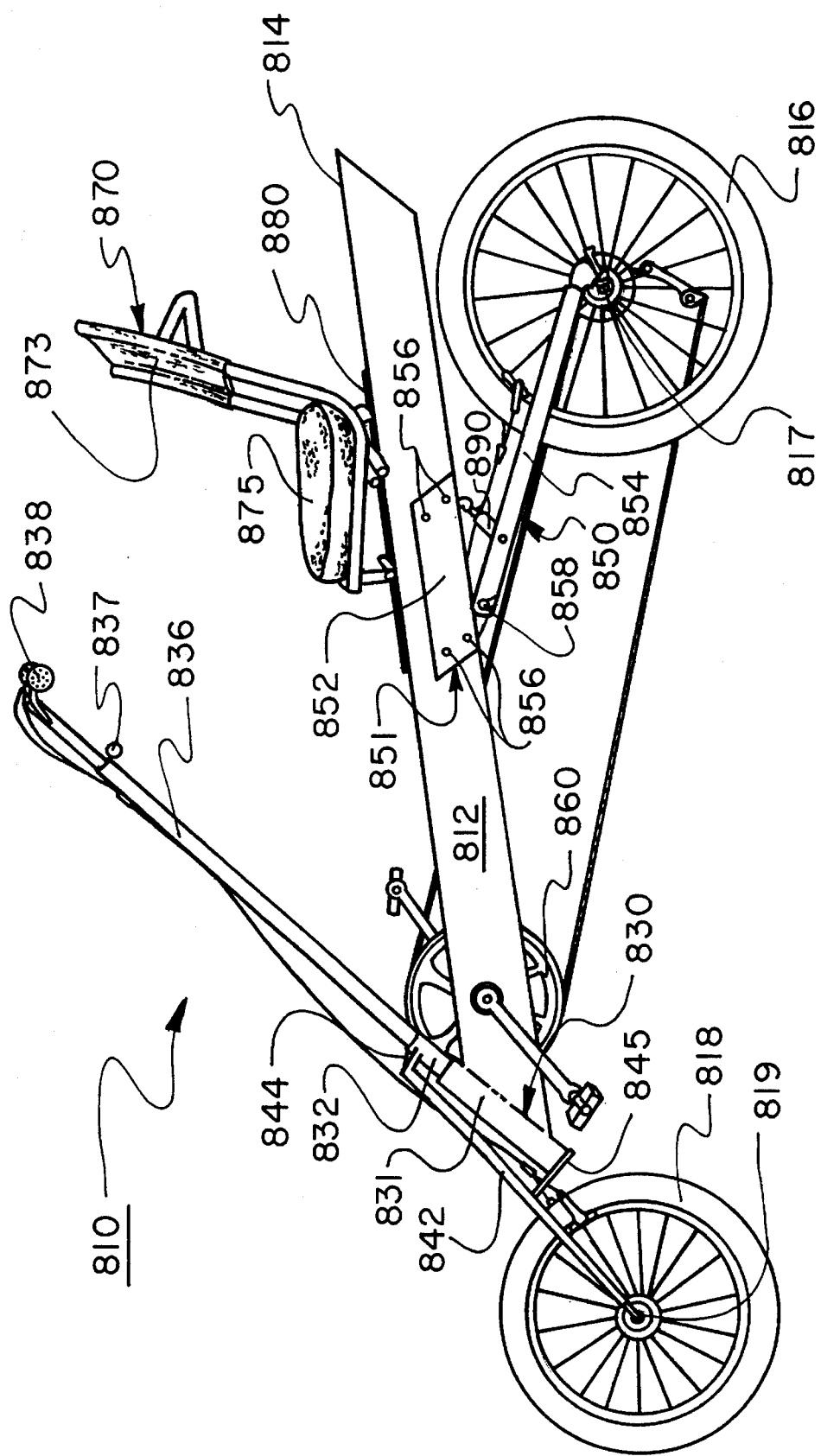
FIG. 8 is a side elevation of a recumbent bicycle comprising a third embodiment of the present invention.

The modular nature of the construction of recumbent bicycle 10 comprising the preferred embodiment allows variations of that bicycle to be manufactured which, while having disparate characteristics, nonetheless have a large number of common components. For example, a rear support module may be utilized which has support members fabricated of a more elastic material to provide a spring effect to soften the ride of the bicycle. Recumbent bicycle 800 comprising an alternative embodiment of the invention is shown in side elevation in FIG. 8 in which similar reference numbers identify elements of that bicycle similar to those of the embodiment of FIG. 1. Rear support members 854 of rear support module 850 of bicycle 800 are pivotally attached to support saddle 851 at 858 and pivot about a horizontal axis. Spring and dampening element 890, such as are well known in the mechanical arts, biases support member 854 to a selected position relative to support saddle 851 and provides a ride softening suspension system. Either of these alternative rear support modules can be employed while utilizing all other components of the bicycle without modification.

Further, a rear support module can be utilized which has a greater lateral distance between the distal ends of the support members and with two wheels carried on the axle, each to the outside of a support member, to provide a tricycle configuration. In such case, it is desirable to change the trail of the front wheel. This can be accomplished by utilizing a front fork module identical to that of bicycle 10 of FIG. 1 except for modification of the distance by which the lower support plate supports the lower portion of the front fork support members in front of the steering head axis. All other structural components of the fork module, and all other modules of the bicycle could be utilized without modification in a tricycle version.

While exemplary recumbent bicycle comprising a preferred embodiment of the present invention has been shown, it will be understood, of course, that the invention is not limited to that embodiment. Modification may be made by those skilled in the art, particularly in light of the foregoing teachings. It is, therefore, contemplated by the appended claims to cover any such modification which incorporates the essential features of this invention or which encompasses the spirit and scope of the invention.

We claim:

1. A bicycle comprising:

a tubular frame member with a longitudinal axis running from a front frame member end portion to a rear frame member end portion;

a rear support module, said module including a support saddle for nestingly embracing and supporting said rear end portion, said support saddle including a bottom panel and first and second side panels fixed to said bottom panel and extending upward to a first and second free upper edge, respectively, said first and second side panels maintained in rigid, set apart, parallel relation by said bottom panel at such a distance one from the other that, when said rear frame member end portion rests upon said bottom panel, said frame member is maintained in an alignment with said bottom panel by said first and second side panels;

a first rear support member with a saddle end attached to said support saddle and extending downward from said saddle end to a first support member distal end portion;

an axle attached to said first support member distal end portion; and, a rear wheel mounted upon said axle such that said frame member is supported by said rear wheel.

2. A bicycle as in claim 1, in which said first rear support member saddle end is rigidly attached to said support saddle.

3. A bicycle as in claim 1, further comprising:

said first support member saddle end is attached to said first side wall portion;

a second rear support member with a saddle end attached to said second wall portion and extending downward from said saddle end to a second support member distal end portion; and, said axle is also attached to said second support member distal end such that said frame member is supported above said rear wheel by both said first and second support members.

4. A bicycle as in claim 1, in which said first rear support member distal end portion is bifurcated providing first and second distal support member end portions and said axle is attached to said first and second distal end portions at first and second axle ends, respectively.

5. A bicycle as in claim 1, in which said frame member includes a rearward fender portion above said rear wheel extending beyond a vertical plane including a central axes of said rear axle when the bicycle is supported by a horizontal surface.

6. A bicycle as in claim 1, in which said first rear support member is a cantilever support member rigidly attached to said support saddle and extending freely, without further support, downward from said saddle end to said free first support member distal end portion.

7. A bicycle as in claim 6, in which said first rear support member includes an elastic material of an elasticity selected to soften the ride of the bicycle.

8. A bicycle as in claim 1, in which said first rear support member saddle end is pivotally attached to said support saddle.

9. A bicycle as in claim 8, further comprising:

a spring member with a first end attached to said support saddle and a second end attached to said first rear support member.

10. A bicycle as in claim 9, further comprising:

a damping member with a first end attached to said support saddle and a second end attached to said first rear support member.

11. A bicycle comprising:

a tubular frame member having a longitudinal axis running from a front frame member portion to a rear frame member portion and having a planar top, planar bottom and planar first and second sides about a rectangular cross section with a vertical cross section axis, said planar top laterally extending beyond said first and second planar sides to provide first and second seat track portions extending outwardly from said tubular frame member and lying in a common plane with one another and said top;

a seat assembly, said assembly including Opposing slide blocks for slidingly engaging said first and second track portions with said cross section axis lying between said blocks and clamping means for drawing said opposing slide blocks one toward the other in such a manner as to clamp said track portions therebetween and prevent motion of the seat along said track portions, said clamping means including a quick release passing through each of said opposing slide blocks.

12. A bicycle as in claim 11, in which said track portions are integral with said frame member.

13. A bicycle as in claim 11, in which said slide blocks are fabricated of an elastic material.

14. A bicycle as in claim 13, in which said slide blocks are fabricated of Derlin acetal resin material.

15. A bicycle comprising:

a tubular frame member having a longitudinal axis running from a front frame member portion to a rear frame member portion and having a planar top, planar bottom and planar first and second sides about a rectangular cross section with a vertical cross section axis, said planar top laterally extending beyond said first and second planar sides to provide first and second seat track portions extending outwardly from said tubular frame member and lying in a common plane with one another and said top;

a seat assembly, said assembly including opposing slide blocks for slidingly engaging said first and second track portions with said cross section axis lying between said blocks and clamping means for drawing said opposing slide blocks one toward the other in such a manner as to clamp said track portions therebetween and prevent motion of the seat along the track, said clamping means including a quick release passing through each of said opposing slide blocks;

a rear support saddle for nestingly embracing and supporting said rear portion, said saddle including a bottom panel and first and second side panels fixed to said bottom panel and maintained in rigid, set apart, parallel relation by said bottom panel at such a distance one from the other that, when a portion of said frame member rests upon said bottom panel, said frame member portion is maintained in an alignment with said bottom panel by said first and second side panels;

a rear support member with a saddle end attached to said support saddle and extending downward from said saddle end to a support member distal end portion;

an axle attached to said support member distal end portion; and a rear wheel mounted upon said axle such that said frame member is supported by said rear wheel.

* * * * *